United States Patent
Koda et al.

(10) Patent No.: US 11,110,817 B2
(45) Date of Patent: Sep. 7, 2021

(54) EQUALIZATION CONTROL DEVICE AND IN-VEHICLE POWER SUPPLY DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Naoya Koda, Mie (JP); Shigeyuki Fujii, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 120 days.

(21) Appl. No.: 16/484,266

(22) PCT Filed: Jan. 26, 2018

(86) PCT No.: PCT/JP2018/002419
§ 371 (c)(1),
(2) Date: Aug. 7, 2019

(87) PCT Pub. No.: WO2018/147091
PCT Pub. Date: Aug. 16, 2018

(65) Prior Publication Data
US 2020/0001740 A1    Jan. 2, 2020

(30) Foreign Application Priority Data
Feb. 7, 2017  (JP) .............................. JP2017-020191

(51) Int. Cl.
*B60L 58/22*    (2019.01)
*B60L 50/60*    (2019.01)
*H02J 7/00*    (2006.01)

(52) U.S. Cl.
CPC ............... *B60L 58/22* (2019.02); *B60L 50/60* (2019.02); *H02J 7/0016* (2013.01); *H02J 7/0021* (2013.01)

(58) Field of Classification Search
CPC ...................................................... B60L 58/22
(Continued)

(56) References Cited

U.S. PATENT DOCUMENTS

2003/0044689 A1    3/2003    Miyazaki et al.
2003/0222619 A1    12/2003    Formenti et al.
(Continued)

FOREIGN PATENT DOCUMENTS

JP    H9-023590 A    1/1997
JP    2000-197279 A    7/2000
(Continued)

OTHER PUBLICATIONS

International Search Report, Application No. PCT/JP2018/002419, dated Feb. 20, 2018. ISA/Japan Patent Office.

*Primary Examiner* — Edward Tso
*Assistant Examiner* — Ahmed H Omar
(74) *Attorney, Agent, or Firm* — Honigman LLP

(57) ABSTRACT

Provided is an equalization control device that can perform ex-post adjustment of a threshold serving as a reference when equalizing cell voltages of multiple cells. An equalization control device has a voltage detection unit that individually detects each cell voltage in a plurality of cells, an individual discharge unit that individually discharges each cell, a setting unit that sets, in an updatable manner, a threshold as a reference value for comparing with the cell voltage detected by the voltage detection unit, and a control unit that controls the individual discharge unit. The control unit compares each cell voltage detected by the voltage detection unit with the threshold set by the setting unit, and
(Continued)

performs control to selectively discharge a discharge target cell having a larger cell voltage than the threshold.

4 Claims, 6 Drawing Sheets

(58) Field of Classification Search
USPC .......................................................... 320/119
See application file for complete search history.

(56) References Cited

U.S. PATENT DOCUMENTS

| | | | |
|---|---|---|---|
| 2010/0019725 A1* | 1/2010 | Nakatsuji | H02J 7/0016 320/118 |
| 2013/0202918 A1* | 8/2013 | Kimura | H02H 3/207 429/7 |

FOREIGN PATENT DOCUMENTS

| | | | | |
|---|---|---|---|---|
| JP | 2001-025162 A | | 1/2001 | |
| JP | 2013-005678 A | * | 1/2013 | ................ H02J 7/02 |
| JP | 2013-005678 A | | 1/2013 | |
| JP | 2015-023698 A | | 2/2015 | |
| JP | 2016-034221 A | | 3/2016 | |

* cited by examiner

EQUALIZATION CONTROL DEVICE AND IN-VEHICLE POWER SUPPLY DEVICE

CROSS-REFERENCE TO RELATED APPLICATIONS

This application is the U.S. national stage of PCT/JP2018/002419 filed on Jan. 26, 2018, which claims priority of Japanese Patent Application No. JP 2017-020191 filed on Feb. 7, 2017, the contents of which are incorporated herein.

TECHNICAL FIELD

The present disclosure relates to an equalization control device and an in-vehicle power supply device.

BACKGROUND ART

In vehicles, a power storage device is mounted for use as a main power supply, a backup power supply or the like. For example, electric double-layer capacitors have a high capacitance and also have excellent charge/discharge cycle characteristics, and are thus used for batteries such as an in-vehicle backup power supply. Such an electric double-layer capacitor, in the case of being utilized for supplying a large current, is generally used as a module in which a plurality of electric double-layer capacitor cells are connected in series.

However, when charging and discharging with such a module, a difference will occur in the inter-terminal voltages of the cells, caused by variability in characteristics such as the capacitance and leakage resistance of the cells. Thus, with the equalization charging device of Patent Document 1, for example, the voltages of the cells are equalized, by discharging cells that exceed a predetermined voltage (reference voltage).

Equalization means included in the equalization charging device of Patent Document 1 is a configuration provided with a voltage regulator diode corresponding to each cell in order to produce a constant voltage (reference voltage) that serves as an equalization voltage. With this configuration, there is a problem in that variability increases since a voltage comparison circuit and the reference voltage of each cell are generated with an analog circuit, and the reference voltage is, moreover, fixed at a constant value. With such a configuration, even if the reference voltage shifts from a desired value due to manufacturing variability or the like, or circumstances arise that call for the reference voltage to be changed due to a temperature change, the reference voltage cannot be adjusted ex post.

The present disclosure has been made based on the above circumstances, and an object thereof is to provide an equalization control device or an in-vehicle power supply device that can perform ex-post adjustment of a threshold serving as a reference when equalizing cell voltages of a plurality of cells.

SUMMARY

An equalization control device of a first mode of the present disclosure is an equalization control device for equalizing a cell voltage of an in-vehicle power storage unit that includes a plurality of cells, including a voltage detection unit, a setting unit, a charge unit, a control unit and a temperature detection unit. The voltage detection unit is configured to individually detect the cell voltage of each of the cells and an individual discharge unit configured to individually discharge each of the cells. The setting unit is configured to set, in an updatable manner, a first threshold serving as a reference value for comparing with the cell voltage detected by the voltage detection unit. The charge circuit unit is configured to charge the in-vehicle power storage unit. The current detection unit is configured to detect an output current of the charge circuit unit. The control unit is configured to control the individual discharge unit. The temperature detection unit is configured to detect a temperature of the in-vehicle power storage unit. The control unit controls a charge operation of the charge circuit unit such that an output voltage of the in-vehicle power storage unit achieves a charge target voltage, after the current detected by the current detection unit becomes less than or equal to a predetermined value during control of the charge operation, compares the cell voltage of each of the cells detected by the voltage detection unit with the first threshold set by the setting unit and controls the individual discharge unit to selectively discharge a discharge target cell whose cell voltage is higher than the first threshold among the plurality of cells, compares the cell voltage of the discharge target cell with a second threshold that is smaller than the first threshold during discharging of the discharge target cell, while continuing the charge operation of the charge circuit unit, and, in a case where the cell voltage of the discharge target cell reaches the second threshold, causes the individual discharge unit to stop discharging the discharge target cell, and ends the charge operation of the charge circuit unit in a case where discharging is no longer being performed in any of the cells, after discharging of one of the discharge target cells was started, and the setting unit performs setting so as to reduce the first threshold and the second threshold and such that the second threshold decreases more than the first threshold, as the temperature detected by the temperature detection unit increases.

An in-vehicle power supply device of a second mode of the present disclosure includes the above equalization control device and the above in-vehicle power storage unit.

Advantageous Effects of Disclosure

The equalization control device of the first mode is, in the case where a discharge target cell whose cell voltage is larger than a first threshold exists among the plurality of cells constituting the in-vehicle power storage unit, able to achieve equalization of the cell voltage by selectively discharging this discharge target cell. Moreover, since the first threshold serving as a reference when equalizing the cell voltages of a plurality of cells is set in an updatable manner by the setting unit, it becomes possible to adjust the threshold ex post.

The equalization control device of the first mode is able to reliably stop the discharge operation in the case where, after discharging of a discharge target cell is started, the cell voltage of this discharge target cell reaches a second threshold, and is able to adjust the cell voltage of the discharge target cell to a value close to the second threshold with high accuracy.

The equalization control device of the first mode is able to perform charging so as to approximate the output voltage of the in-vehicle power storage unit to a charge target voltage, and is able to perform equalization such that all the cells constituting the in-vehicle power storage unit will be less than or equal to a threshold, in a state where control for approximating the output voltage of the in-vehicle power storage unit to the charge target voltage has been carried out.

The equalization control device of the first mode is able to perform ex-post optimization of the first threshold and the second threshold serving as references when performing equalization, according to the temperature.

The in-vehicle power supply device of the second mode achieves similar effects to the equalization control device of the first mode.

DESCRIPTION OF EMBODIMENTS

Here, desirable examples of the present disclosure will be shown.

A configuration may be adopted in which the control unit causes the individual discharge unit to stop discharging the discharge target cell, in the case where a predetermined time elapses after causing the individual discharge unit to start discharging the discharge target cell.

This equalization control device is, in the case of discharging a discharge target cell whose cell voltage is larger than a threshold, able to adjust to the extent by which the cell voltage decreases with discharge performed for a predetermined time.

A configuration may be adopted in which the equalization control device includes a discharge circuit unit configured to discharge the in-vehicle power storage unit, and the control unit controls the discharge circuit unit such that the output voltage of the in-vehicle power storage unit achieves a discharge target voltage, stops the discharge operation of the discharge circuit unit, after the output voltage of the in-vehicle power storage unit reaches the discharge target voltage, compares the cell voltage of each of the cells with the threshold, after stopping the discharge operation, and, in a case where the discharge target cell is detected, causes the individual discharge unit to discharge the detected discharge target cell.

This equalization control device is able to perform discharging using the discharge circuit unit such that the output voltage of the in-vehicle power storage unit achieves a desired discharge target voltage. Also, this equalization control device is able to perform equalization such that all the cells constituting the in-vehicle power storage unit will be less than or equal to the threshold, after having approximated the output voltage of the in-vehicle power storage unit to the discharge target voltage.

First Embodiment

Hereinafter, a first embodiment that embodies the present disclosure will be described.

Figure 1:
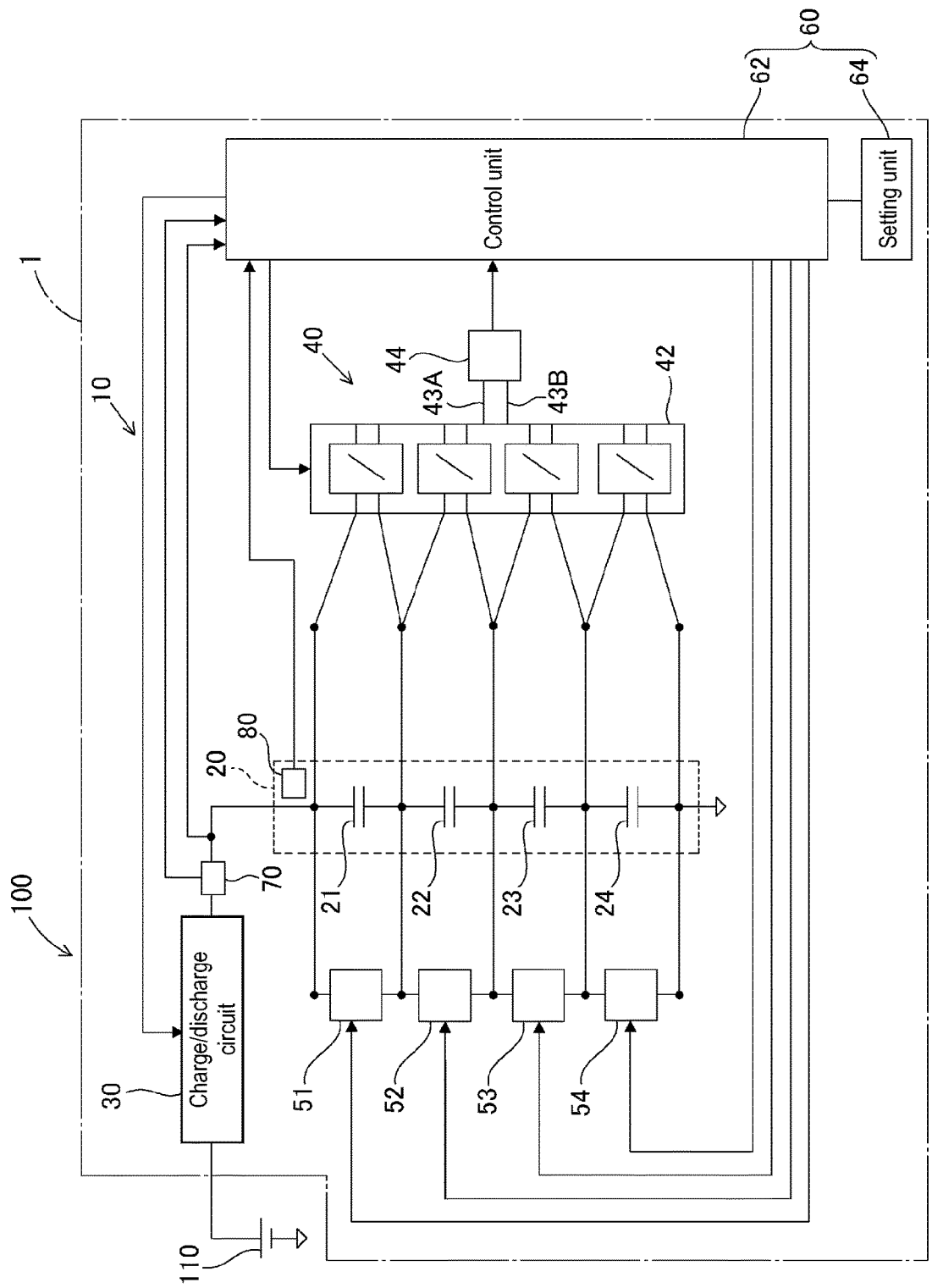
FIG. 1 is a block diagram schematically illustrating an in-vehicle power supply system provided with an equalization control device of a first embodiment.

An in-vehicle power supply system 100 shown in FIG. 1 is provided with an in-vehicle battery 110 serving as a first power supply unit and an in-vehicle power storage unit 20 serving as a second power supply unit, with the in-vehicle power storage unit 20 forming part of an in-vehicle power supply device 1. The in-vehicle battery 110 may, for example, be constituted as a lead battery, or may be constituted by another known power storage means.

The in-vehicle power supply device 1 is provided with the in-vehicle power storage unit 20 and an equalization control device 10, and is configured as a device that can charge and discharge the in-vehicle power storage unit 20.

The in-vehicle power storage unit 20 is constituted as a module in which a plurality of cells 21, 22, 23 and 24 constituted as electric double-layer capacitors are connected in series. Specifically, the cells 21, 22, 23 and 24 are provided so as to be positioned from the high potential side to the low potential side in order of the cell 21, the cell 22, the cell 23 and the cell 24. Also, the high potential side electrode of the cell 21 is electrically connected to a charge/discharge circuit unit 30, and the low potential side electrode of the cell 24 is electrically connected to ground.

The equalization control device 10 is configured as a device that can equalize the cell voltage of the in-vehicle power storage unit 20 provided with the plurality of cells 21, 22, 23 and 24. The cell voltage is the inter-terminal voltage of each of the plurality of cells 21, 22, 23 and 24, and the equalization control device 10 can perform control by reducing variability in the inter-terminal voltages of the cells. Specifically, the equalization control device 10 compares the individual cell voltages (inter-terminal voltages) of the cells 21, 22, 23 and 24 constituting the in-vehicle power storage unit 20 with a reference voltage, and can individually discharge cells exceeding the reference voltage as discharge target cells. As a result of such discharging of discharge target cells, the cell voltages of the plurality of cells 21, 22, 23 and 24 are equalized.

The equalization control device 10 is provided with the charge/discharge circuit unit 30 that charges or discharges the in-vehicle power storage unit 20, a voltage detection unit 40 that detects the cell voltages of the plurality of cells 21, 22, 23 and 24, individual discharge units 51, 52, 53 and 54 that individually discharge the cells 21, 22, 23 and 24, a control circuit 60 that can control the individual discharge units 51, 52, 53 and 54, a current detection unit 70 that detects the output current of the charge/discharge circuit unit 30, and a temperature detection unit 80 that detects the temperature of the in-vehicle power storage unit 20.

Figure 2:
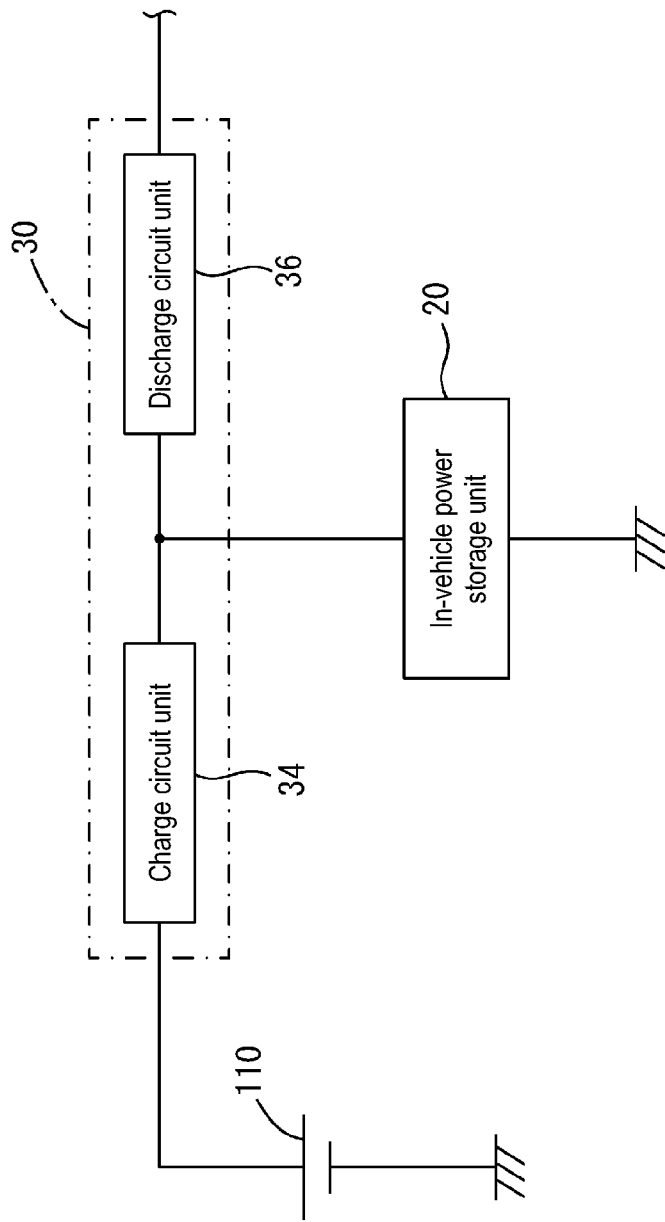
FIG. 2 is a block diagram schematically illustrating a charge/discharge circuit unit and a peripheral configuration thereof.

As shown in FIG. 2, the charge/discharge circuit unit 30 is provided with a charge circuit unit 34 and a discharge circuit unit 36, and can operate so as to charge or discharge the in-vehicle power storage unit 20. The charge circuit unit 34 performs a charge operation for supplying charge current according to control by the control circuit 60, and functions so as to collectively charge the cells 21, 22, 23 and 24. The charge circuit unit 34 is constituted as a known charge circuit by a current regulator circuit, a voltage regulator circuit or the like. The discharge circuit unit 36 performs a discharge operation according to control by the control circuit 60, and functions so as to collectively discharge the cells 21, 22, 23 and 24. The discharge circuit unit 36 is constituted as a known discharge circuit having a resistor, a switch and the like, and performs the discharge operation so as to send discharge current from the in-vehicle power storage unit 20 when a discharge instruction is being given by the control circuit 60, and interrupts current flow so as to stop sending discharge current from the in-vehicle power storage unit 20 when a discharge stop instruction is being given by the control circuit 60.

The voltage detection unit 40 functions so as to individually detect the cell voltages of the cells 21, 22, 23 and 24 (inter-terminal voltages of the cells). This voltage detection unit 40 is provided with a selector 42 that selects a cell for detecting the cell voltage from among the cells 21, 22, 23 and 24, and a voltage measurement unit 44 that measures the cell voltage of the cell selected by this selector 42. The selector 42 is constituted as a known selector, and operates so as to select a target for reading out the cell voltage from among the plurality of cells 21, 22, 23 and 24. The selector 42 switches the readout target cell according to a control signal (switch signal) that is given by the control circuit 60, specifically, performs switching so as respectively connect the respective conduction paths connected to the terminals of the selected cell to input lines 43A and 43B. The voltage measurement unit 44 measures the inter-terminal voltage of the cell selected by the selector 42 (specifically, the potential difference between the input lines 43A and 43B), and inputs a detection value indicating the inter-terminal voltage of the selected cell to the control circuit 60. Specifically, whenever the switch signal is given by the control circuit 60, the cells are selected in order of the cells 21, 22, 23 and 24, and detection values indicating the cell voltages of the cells 21, 22, 23 and 24 are input in order to the control circuit 60 by the voltage measurement unit 44.

The individual discharge units 51, 52, 53 and 54 are circuits that can individually discharge each of the plurality of cells 21, 22, 23 and 24. The individual discharge units 51, 52, 53 and 54 are constituted as known discharge circuits that function so as to emit power stored by the cells 21, 22, 23 and 24, and have resistors, switches, and the like. Specifically, the individual discharge units 51, 52, 53 and 54 are connected in series so as to be positioned from the high potential side to the low potential side in order of the individual discharge unit 51, the individual discharge unit 52, the individual discharge unit 53, and the individual discharge unit 54. The individual discharge unit 51 corresponding to the cell 21 is connected in parallel with the cell 21, and can selectively discharge the cell 21 in response to the discharge instruction from the control circuit 60. The individual discharge unit 52 corresponding to the cell 22 is connected in parallel with the cell 22, and can selectively discharge the cell 22 in response to the discharge instruction from the control circuit 60. The individual discharge unit 53 corresponding to the cell 23 is connected in parallel with the cell 23, and can selectively discharge the cell 23 in response to the discharge instruction from the control circuit 60. The individual discharge unit 54 corresponding to the cell 24 is connected in parallel with the cell 24, and can selectively discharge the cell 24 in response to the discharge instruction from the control circuit 60.

The control circuit 60 performs overall control of the equalization control device 10. The control circuit 60 may be constituted by a CPU, a microcomputer or the like, or may be constituted by hardware circuitry. The control circuit 60 has a portion that functions as a control unit 62 and a portion that functions as a setting unit 64.

The control unit 62 can perform control for instructing the charge/discharge circuit unit 30 to perform charging or to perform discharging. The control unit 62 can perform control for causing the selector 42 to select one of the cells by transmitting the switch signal (signal for switching the cell selected from among the cells 21, 22, 23 and 24) to the selector 42, and can operate so as to acquire a value indicating the cell voltage (inter-terminal voltage) of the cell selected by the selector 42 from the voltage measurement unit 44. Furthermore, the control unit 62 compares the cell voltages of the cells 21, 22, 23 and 24 with a first threshold set by the setting unit 64, and, with regard to a cell (discharge target cell) whose cell voltage is larger than the first threshold, gives a discharge instruction to the circuit corresponding to the discharge target cell among the individual discharge units 51, 52, 53 and 54 to discharge the discharge target cell.

Figure 5:
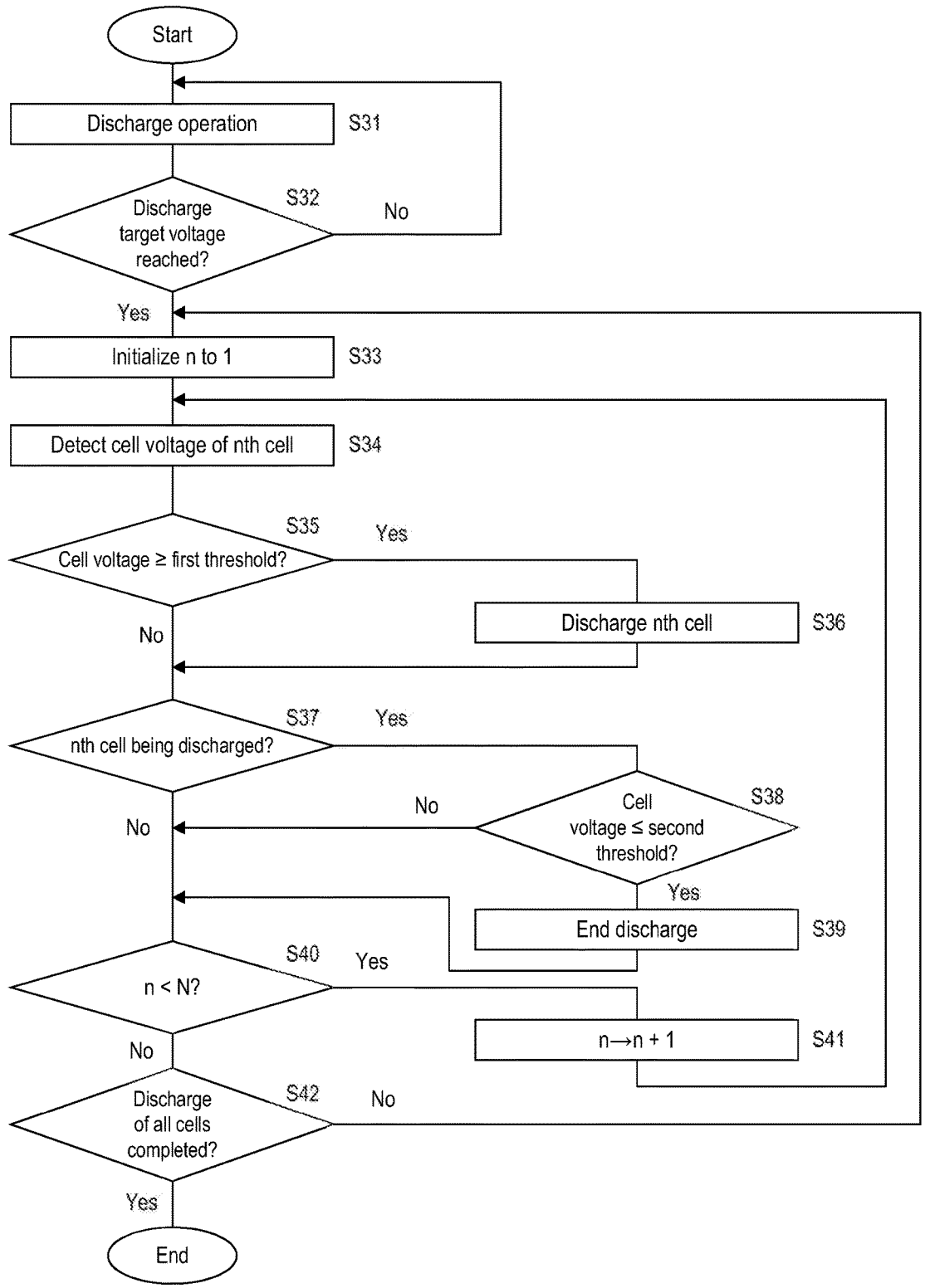
FIG. 5 is a flowchart illustrating the flow of control during discharging in the equalization control device of FIG. 1.
Figure 6:
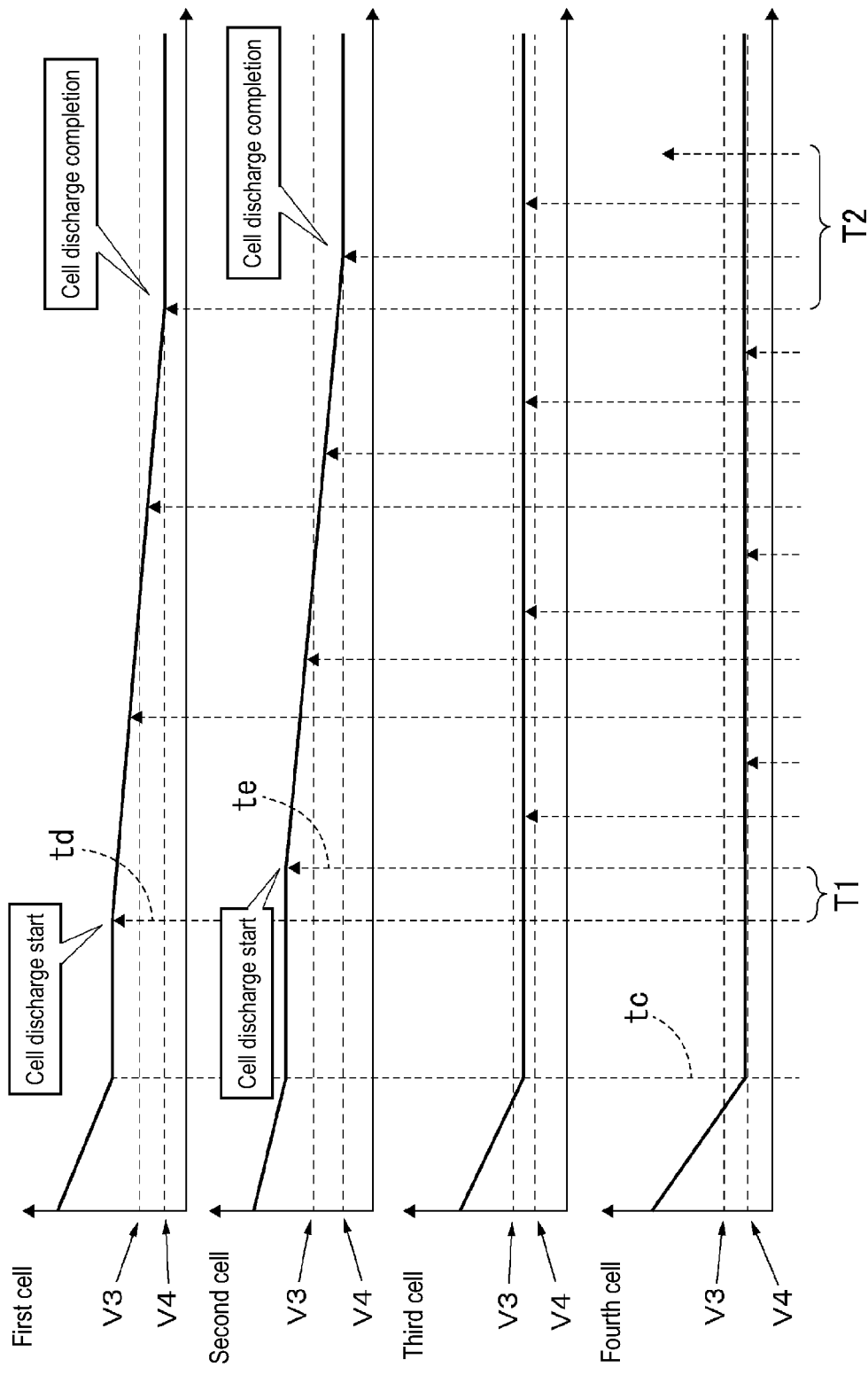
FIG. 6 is a timing chart schematically illustrating a sequence of operations during discharging in the equalization control device of FIG. 1.

The setting unit 64 is, for example, constituted by known storage means, and sets the first threshold serving as a reference value for comparing with the cell voltage detected by the voltage detection unit 40 in an updatable manner. The value stored in the setting unit 64 can be updated under the control of the control unit 62. The control unit 62 may, in response to update data being input from outside, update the first threshold to a value indicated by the update data, for example. Alternatively the control unit 62 may operate so as to update the first threshold set in the setting unit 64 to a value that depends on the temperature detected by the temperature detection unit 80. Note that, in this configuration, a first threshold that is used in control during charging shown in FIG. 3 and FIG. 4 and a first threshold used in control during discharging shown in FIG. 5 and FIG. 6 are different values, and the respective first thresholds are set in the setting unit 64 in an updatable manner, for example. Also, in this configuration, a second threshold that is used in control during charging shown in FIG. 3 and FIG. 4 and a second threshold used in control during discharging shown in FIG. 5 and FIG. 6 are different values, and the respective second thresholds are set in the setting unit 64 in an updatable manner, for example.

The current detection unit 70 is constituted by a known current sensor, and can detect the charge current provided to the in-vehicle power storage unit 20 from the charge/discharge circuit unit 30. This current detection unit 70 provides a value (detection value) that depends on the current flowing through the conduction path between the charge/discharge circuit unit 30 and the in-vehicle power storage unit 20 to the control unit 62.

The temperature detection unit 80 is constituted as a known temperature sensor, and can detect the temperature of the in-vehicle power storage unit 20. The temperature detection unit 80 may be disposed so as to contact one of the cells constituting the in-vehicle power storage unit 20, or may be disposed in proximity to a cell without contact. The temperature detection unit 80 provides a value (detection value) that depends on the temperature of the detection position (surface temperature of the in-vehicle power storage unit 20 or temperature in the vicinity thereof) to the control unit 62.

The equalization control device 10 constituted in this way operates so as to detect the cell voltages of the plurality of cells 21, 22, 23 and 24 using the voltage detection unit 40 in periods during which equalization control should be performed. Also, the equalization control device 10 compares the cell voltage of each of the cells 21, 22, 23 and 24 detected by the voltage detection unit 40 with the first threshold set by the setting unit 64, and controls the individual discharge units 51, 52, 53 and 54 to selectively discharge those discharge target cells 21, 22, 23 and 24 whose cell voltage is larger than the first threshold among the plurality of cells 21, 22, 23 and 24. The following description details the specific contents of such equalization control.

First, equalization control during charging of the in-vehicle power storage unit 20 will be described as an example of equalization control, with reference to FIG. 3, FIG. 4, and the like.

Figure 3:
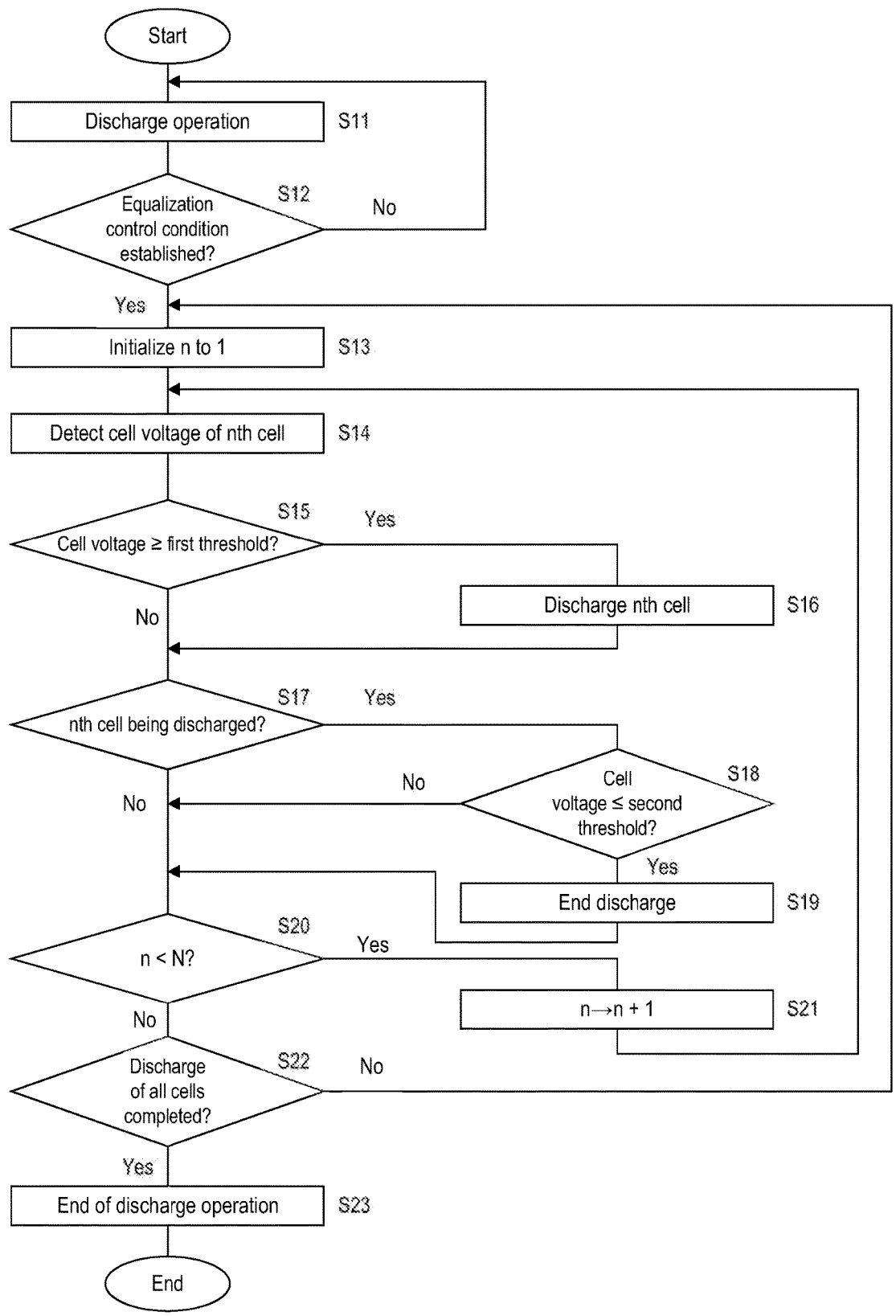
FIG. 3 is a flowchart illustrating the flow of control during charging in the equalization control device of FIG. 1.

The control unit 62 is configured to perform control during charging with a flow such as shown in FIG. 3, when a predetermined charge condition is established. Note that the predetermined charge condition is not particularly limited, and may be "a starter switch (ignition switch, etc.) of the vehicle switching from OFF to ON", for example.

The control unit 62, after starting the control of FIG. 3, first causes the charge circuit unit 34 (FIG. 2) to charge the in-vehicle power storage unit 20 (step S11). Specifically, the control unit 62 causes the charge circuit unit 34 (FIG. 2) to perform the charge operation so as to supply charge current to the in-vehicle power storage unit 20, and controls the charging such that the output voltage of the in-vehicle power storage unit 20 achieves a desired charge target voltage determined in advance. The control unit 62, after starting such charge control, judges, in step S12, whether the equalization control condition has been established. The equalization control condition is a condition for performing equalization of the cell voltages of the cells 21, 22, 23 and 24, and is, for example, established in the case where the discharge current that is detected by the current detection unit 70 falls to less than a predetermined current value a during a predetermined time t. In this case, while the charge current that is detected by the current detection unit 70 has not fallen to less than the predetermined current value a during the predetermined time t, the charge operation of step S11 is performed continuously, and the judgment of step S12 is repeatedly performed.

The control unit 62, in the case of judging that the equalization control condition has been established in step S12, that is, in the case where the charge current that is detected by the current detection unit 70 falls to less than the predetermined current value a during the predetermined time t (in the case of Yes in step S12), initializes a variable n specifying a cell to 1 (step S13). Here, the variable n is a variable specifying one of the cells 21, 22, 23 and 24 constituting the in-vehicle power storage unit 20, and, for example, the nth cell indicates the cell 21 when n is 1, indicates the cell 22 when n is 2, indicates the cell 23 when n is 3, and indicates the cell 24 when n is 4. Next, the cell voltage of the nth cell is detected (step S14). For example, in the case where n is set to 1, the voltage detection unit 40 detects the cell voltage of the cell 21. Next, the control unit 62 judges whether the cell voltage detected in step S14 is greater than or equal to the first threshold set in the setting unit 64 (step S15). The control unit 62, in the case of judging that the cell voltage is not greater than or equal to the first threshold set by the setting unit 64 (No in step S15), advances to the processing of step S17. Note that, in the examples shown in FIG. 4 and the like, the first threshold that is used in control during charging shown in FIG. 3 is given as V1, for example, and the second threshold is given as V2, for example.

The control unit 62, in the case of judging that the cell voltage is greater than or equal to the first threshold set by the setting unit 64 in step S15 (Yes in step S15), discharges the nth cell with the corresponding individual discharge unit among the individual discharge units 51, 52, 53 and 54 (step S16). For example, the control unit 62, in the case of judging that the cell 21 is greater than or equal to the first threshold set by the setting unit 64, discharges the cell 21 with the individual discharge unit 51 connected thereto. The control unit 62 advances to step S17 after the processing of step S16.

The control unit 62, in the case of judging that the cell voltage is not greater than or equal to the first threshold set by the setting unit 64 in step S15, or in the case of judging whether the nth cell is undergoing discharge processing after the processing of step S16, and judging that the nth cell is undergoing discharge processing (Yes in step S17), judges, in step S18, whether the cell voltage of the nth cell is less than or equal to the second threshold. In this configuration, not only the first threshold but also the second threshold is set in an updatable manner in the setting unit 64 as a value smaller than the first threshold. In step S18, the control unit 62 judges whether the cell voltage of the nth cell is less than or equal to the second threshold, based on the second threshold set in the setting unit 64. In step S18, the control unit 62, in the case of judging that the cell voltage of the nth cell is less than or equal to the second threshold, advances to step S19 and ends discharging of the nth cell. In step S18, in the case of judging that the cell voltage of the nth cell is not less than or equal to the second threshold, advances to step S20, without ending discharging of the nth cell.

In step S20, the control unit 62 judges whether the variable n at the time of execution of step S20 is smaller than the number N of cells constituting the in-vehicle power storage unit 20. For example, N is 4 in the case where the number N of cells constituting the in-vehicle power storage unit 20 is four, as with the equalization control device 10 shown in FIG. 1. The control unit 62, in the case of judging that the variable n is smaller than the number N of cells (No in step S20), changes the variable n to n+1 in step S21, and again performs the processing from step S14. For example, the control unit 62, in the case where the variable n is 1 before performing the processing of S21, changes the value of n to 2 in step S21, and performs the processing from step S14 on the cell 22, which is the second cell.

On the other hand, the control unit 62, in the case of judging in step S20 that the variable n is not smaller than the number N of cells, advances to the processing of S22. For example, the control unit 62, in the case where the number of cells constituting the in-vehicle power storage unit 20 is four, and the variable n is 4 before performing the processing of S20, judges that the variable n is not smaller than the number N of cells. The control unit 62, in step S22, judges whether equalization control of all the cells constituting the in-vehicle power storage unit 20 has ended. Specifically, for example, the control unit 62, in the case where a state in which all the cells are not in a discharge state continues for a predetermined reference time T2, judges that equalization control of all the cells has ended, ends the charge operation by the charge circuit unit 34 in step S23, and ends the control of FIG. 3.

Figure 4:
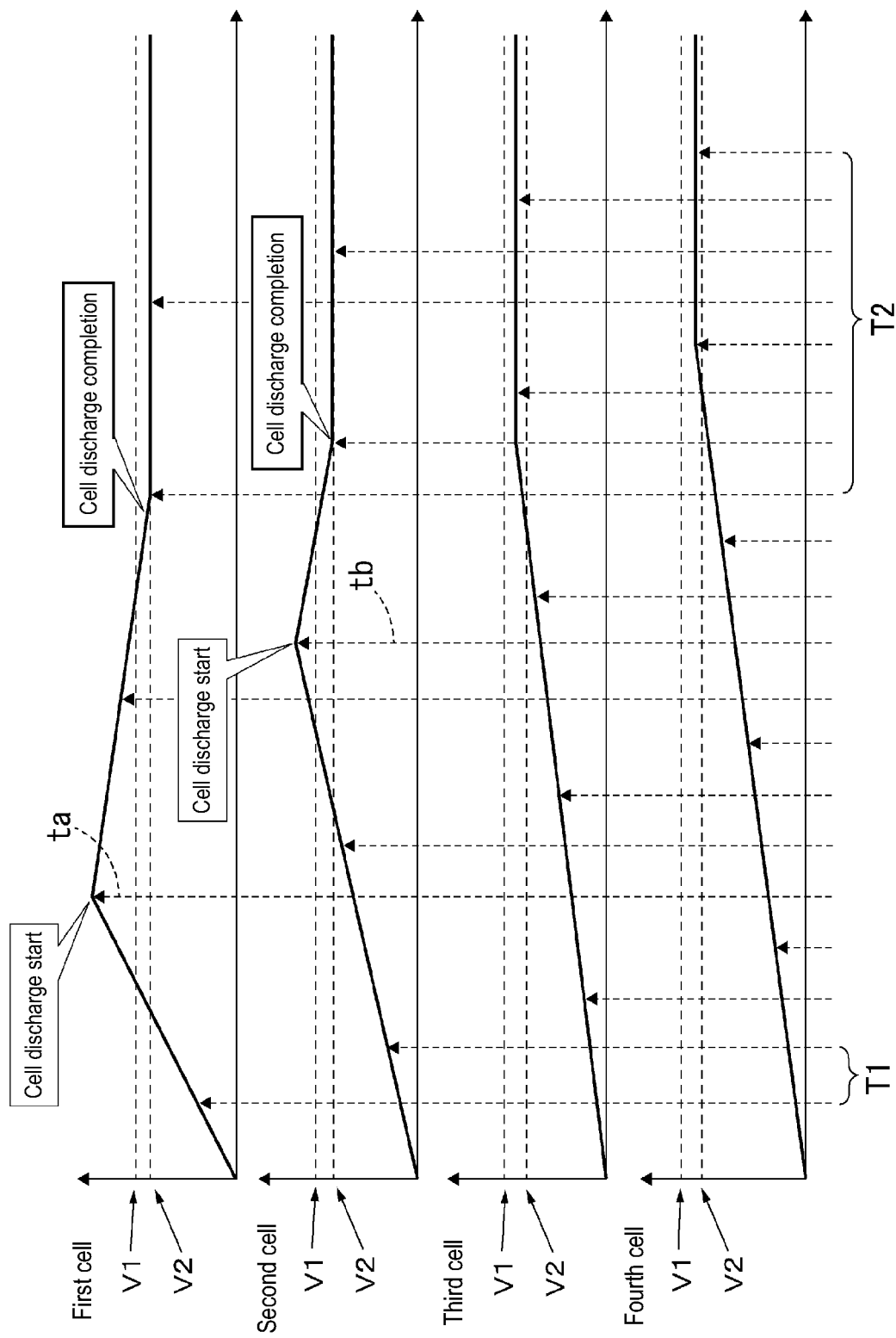
FIG. 4 is a timing chart schematically illustrating a sequence of operations during charging in the equalization control device of FIG. 1.

In the case of performing the control of FIG. 3, charging or discharging of the cells is carried out with a sequence such as shown in FIG. 4. In the example of FIG. 4, the cells are gradually charged, after charging of the in-vehicle power storage unit 20 starts in response to execution of the control of FIG. 3. Equalization control of the cell voltage is then carried out by the control of FIG. 3, while performing control for approximating the output voltage of the in-vehicle power storage unit 20 to the charge target voltage. In such equalization control, measurement of the cell voltages is performed at intervals of time T1, for example. In the sequence of FIG. 4, since the cell voltage of the first cell 21 exceeds the first threshold V1 at a first time ta after charging of the in-vehicle power storage unit 20 has proceeded, discharge control is individually carried out on the first cell 21 from the inspection time point ta. This discharge control is executed until the cell voltage of the first cell 21 becomes less than or equal to the second threshold V2. Furthermore, since the cell voltage of the second cell 22 exceeds the first threshold V1 at a second time tb, discharge control is individually carried out on the second cell 22 from the inspection time point tb. This discharge control is executed until the cell voltage of the second cell 22 becomes less than or equal to the second threshold V2. While equalization control of the cell voltage is carried out in this way, charge control is carried out by the charge/discharge circuit unit 30 and the control unit 62 such that the output voltage of the in-vehicle power storage unit 20 achieves the charge target voltage, and in the case where a state in which all the cells are not in a discharge state continues for the predetermined reference time T2, equalization control of the cell voltage shown in FIG. 3 is ended.

Next, equalization control during discharging of the in-vehicle power storage unit 20 will be described as another example of equalization control, with reference to FIG. 5, FIG. 6, and the like.

The control unit 62 is configured to perform control during discharging with a flow such as shown in FIG. 5, when a predetermined discharge condition is established. Note that the predetermined discharge condition is not particularly limited, and may, for example, be "a starter switch (ignition switch, etc.) of the vehicle switching from ON to OFF".

The control unit 62, after starting the control of FIG. 5, first causes the discharge circuit unit 36 (FIG. 2) to perform the discharge operation so as to discharge the in-vehicle power storage unit 20 (step S31). Specifically, the control unit 62 causes the discharge circuit unit 36 (FIG. 2) to perform the discharge operation to send discharge current from the in-vehicle power storage unit 20, and controls discharging such that the output voltage of the in-vehicle power storage unit 20 achieves a desired discharge target voltage determined in advance. The control unit 62, after starting such discharge control, judges, in step S32, whether the discharge target voltage has been reached. The control unit 62 advances to step S33, in the case of judging, in step S32, that the output voltage of the in-vehicle power storage unit 20 has fallen to less than or equal to the discharge target voltage (in the case of Yes in step S32), and continues the discharge operation of step S31 and repeats the judgment of step S32 if this is not the case.

The control unit 62, in the case of judging, in step S32, that the output voltage of the in-vehicle power storage unit 20 has fallen to less than or equal to the discharge target voltage, initializes the variable n specifying a cell to 1 (step S33). Next, the cell voltage of the nth cell is detected (step S34). For example, the control unit 62, in the case where n is set to 1, detects the cell voltage of the cell 21 with the voltage detection unit 40. Next, the control unit 62 judges whether the cell voltage detected in step S34 is greater than or equal to the first threshold set in the setting unit 64 (step S35). The control unit 62, in the case of judging that the cell voltage is not greater than or equal to the first threshold set by the setting unit 64 (No in step S35), advances to the processing of step S37. Note that, in the example of control during discharging shown in FIG. 5, FIG. 6 and the like, the first threshold is given as V3, for example, and the second threshold is given as V4, for example.

The control unit 62, in the case of judging, in step S35, that the cell voltage is greater than or equal to the first threshold set by the setting unit 64 (Yes in step S35), discharges the nth cell with the corresponding individual discharge unit among the individual discharge units 51, 52, 53 and 54 (step S36). For example, the control unit 62, in the case of judging that the cell 21 is greater than or equal to the first threshold set by the setting unit 64, discharges the cell 21 with the individual discharge unit 51 connected thereto. The control unit 62 advances to step S37 after the processing of step S36.

The control unit 62, in the case of judging, in step S35, that the cell voltage is not greater than or equal to the first threshold set by the setting unit 64, or in the case of judging whether the nth cell is undergoing discharge processing after the processing of step S36, and judging that the nth cell is undergoing discharge processing (in the case of Yes in step S37), judges, in step S38, whether the cell voltage of the nth cell is less than or equal to the second threshold. The control unit 62, in the case of judging, in step S38, that the cell voltage of the nth cell is less than or equal to the second threshold, advances to step S39, and ends discharging of the nth cell. The control unit 62, in the case of judging, in step S38, that the cell voltage of the nth cell is not less than or equal to the second threshold, advances to step S40 without ending discharging of the nth cell.

In step S40, the control unit 62 judges whether the variable n at the time of execution of step S40 is smaller than the number N of cells constituting the in-vehicle power storage unit 20. The control unit 62, in the case of judging that the variable n is smaller than the number N of cells (No in step S40), changes the variable n to n+1 in step S41, and again performs the processing from step S34. For example, the control unit 62, in the case where the variable n is 1 before the processing of S41, in step S41, changes the value of n to 2, and performs the processing from step S34 on the cell 22, which is the second cell.

On the other hand, the control unit 62, in the case of judging, in step S40, that the variable n is not smaller than the number N of cells constituting the in-vehicle power storage unit 20, advances to the processing of S42. For example, the control unit 62, in the case where the number N of cells constituting the in-vehicle power storage unit 20 is four, and the variable n is 4 before performing the processing of S40, judges that the variable n is not smaller than the number N of cells. The control unit 62 judges, in step S42, whether equalization control of all the cells constituting the in-vehicle power storage unit 20 has ended.

Specifically, for example, the control unit 62, in the case where a state in which all the cells are not in the discharge state continues for the predetermined reference time T2, judges that equalization control of all the cells has ended, and ends the control of FIG. 5.

In the case of performing the control of FIG. 5, charging or discharging of the cells is carried out with a sequence such as shown in FIG. 6. In the example of FIG. 6, the cells are gradually discharged, after discharging of the in-vehicle power storage unit 20 starts in response to execution of the control of FIG. 5. Discharging by the discharge circuit unit 36 then stops, after the output of the in-vehicle power storage unit 20 reaches the discharge target voltage (after time tc in the example of FIG. 6). Thereafter, equalization control of the cell voltage is carried out with the control of FIG. 5. In such equalization control, measurement of the cell voltages is performed at intervals of time T1, for example. In the sequence of FIG. 6, since the cell voltage of the first cell 21 exceeds the first threshold V3 at an inspection time point td, discharge control is individually carried out on the first cell 21 from the inspection time point td. This discharge control is executed until the cell voltage of the first cell 21 becomes less than or equal to the second threshold V4. Furthermore, since the cell voltage of the second cell 22 exceeds the first threshold at time te, discharge control is individually carried out on the second cell 22 from the inspection time point te. This discharge control is executed until the cell voltage of the second cell 22 becomes less than or equal to the second threshold V4. Equalization control of the cell voltage is carried out in this way, and in the case where a state in which all the cells are not in a discharge state continues for the predetermined reference time T2, equalization control of the cell voltage shown in FIG. 5 and FIG. 6 is ended.

Next, the effects of this configuration will be illustrated.

The equalization control device 10 shown in FIG. 1 and the like is, in the case where a discharge target cell whose cell voltage is larger than a threshold exists among the plurality of cells 21, 22, 23 and 24 constituting the in-vehicle power storage unit 20, able to achieve equalization of the cell voltage by selectively discharging this discharge target cell. Moreover, since the threshold serving as a reference when equalizing the cell voltages of the plurality of cells 21, 22, 23 and 24 is set in an updatable manner by the setting unit 64, it becomes possible to adjust the threshold ex post.

The control unit 62, after causing the individual discharge units 51, 52, 53 and 54 to start discharging a discharge target cell, compares the cell voltage of the discharge target cell with a second threshold that is smaller than the threshold during discharging of the discharge target cell, and performs controls so as to stop discharging of the discharge target cell in the case where the cell voltage of the discharge target cell reaches the second threshold. This equalization control device 10 is able to reliably stop the discharge operation in the case where the cell voltage of the discharge target cell reaches the second threshold after discharging of this discharge target cell is started, and is able to adjust the cell voltage of the discharge target cell to a value close to the second threshold with high accuracy.

The equalization control device 10 has a charge circuit unit 34 that charges the in-vehicle power storage unit 20, and a current detection unit 70 that detects the output current from the charge circuit unit 34. The control unit 62 controls the charge operation of the charge circuit unit 34 such that the output voltage of the in-vehicle power storage unit 20 achieves the charge target voltage, compares the cell voltages of the cells 21, 22, 23 and 24 with a threshold after the current that is detected by the current detection unit 70 becomes less than or equal to a predetermined value, and, in the case where a discharge target cell is detected, causes the individual discharge units 51, 52, 53 and 54 to discharge the detected discharge target cell. This equalization control device 10 is able to perform charging so as to approximate the output voltage of the in-vehicle power storage unit 20 to the charge target voltage, and is able to cause equalization to be performed so that all the cells 21, 22, 23 and 24 constituting the in-vehicle power storage unit 20 will be less than or equal to a threshold, in a state where control for approximating the output voltage of the in-vehicle power storage unit 20 to the charge target voltage has been carried out.

The equalization control device 10 is provided with a discharge circuit unit 36 that discharges the in-vehicle power storage unit 20, and the control unit 62 controls the discharge circuit unit 36 such that the output voltage of the in-vehicle power storage unit 20 achieves the discharge target voltage, stops the discharge operation of the discharge circuit unit 36, after the output voltage of the in-vehicle power storage unit 20 reaches the discharge target voltage, compares the cell voltages of the cells 21, 22, 23 and 24 with a threshold, after stopping the discharge operation, and, in the case where a discharge target cell is detected, causes the individual discharge units 51, 52, 53 and 54 to discharge the detected discharge target cell. This equalization control device 10 is able to perform discharging with the discharge circuit unit 36 such that the output voltage of the in-vehicle power storage unit 20 achieves a desired discharge target voltage. The equalization control device 10, having approximated the output voltage of the in-vehicle power storage unit 20 to the discharge target voltage, is able to perform equalization such that all the cells 21, 22, 23 and 24 constituting the in-vehicle power storage unit 20 will be less than or equal to the threshold.

The equalization control device 10 is provided with a temperature detection unit 80 that detects the temperature of the in-vehicle power storage unit 20, and the setting unit 64 performs setting so as to reduce the threshold (first threshold) as the temperature detected by the temperature detection unit 80 increases. Specifically, a table in which temperatures are associated with thresholds (first thresholds), a computing equation or the like can be used so as reduce the threshold (first threshold) as the temperature increases, and the control unit 62 need only grasp the temperature detected by the temperature detection unit 80 at a predetermined timing, specify the threshold (first threshold) associated with the detected temperature with reference to the table or the computing equation, and update the threshold (first threshold) that is set by the setting unit 64 to the specified threshold (first threshold). Note that the predetermined timing may, for example, be the switching timing of a starter switch of the vehicle (timing of switching from OFF to ON or timing of switching from ON to OFF), or may be another timing.

The equalization control device 10 constituted in this way is able to perform ex-post optimization of the threshold (first threshold) serving as a reference when performing equalization, according to the temperature.

The second threshold may also be set to a value that depends on the temperature, similarly to the first threshold. Specifically, a table in which temperatures are associated with second thresholds, a computing equation or the like can be used so as to reduce the second threshold and such that the second threshold decreases more than the first threshold, as the temperature detected by the temperature detection unit 80 increases, and the control unit 62 need only grasp the temperature detected by the temperature detection unit 80 at a predetermined timing, specify the second threshold associated with the detected temperature with reference to the table or the computing equation, and update the second threshold that is set by the setting unit 64 to the specified second threshold.

Other Embodiments

The present disclosure is not limited to the first embodiment illustrated in the above description and drawings, and embodiments such as the following, for example, are also encompassed in the technical scope of the disclosure.

Although the first embodiment describes an example in which the control unit 62, after causing an individual discharge unit to start discharging a discharge target cell, ends discharging in the case where the cell voltage of the discharge target cell reaches a second threshold, the present disclosure is not limited to this example. The control unit 62 may be configured to stop discharging of a discharge target cell by an individual discharge unit, in the case where a predetermined time elapses, after causing the individual discharge unit to start discharging the discharge target cell. In other words, discharge may be stopped based on the elapsed time from the start of discharge, rather than stopping discharge based on the second threshold. This equalization control device 10 is, in the case of discharging a discharge target cell whose cell voltage is larger than a threshold, able to adjust to the extent by which the cell voltage decreases with discharge performed for a predetermined time.

The first embodiment illustrates a configuration in which, in equalization control during discharging of the in-vehicle power storage unit 20, the discharge operation of the in-vehicle power storage unit 20 (S31) is performed by the discharge circuit unit 36, but a configuration may be adopted in which the discharge operation of the in-vehicle power storage unit 20 is performed by the individual discharge units 51 to 54. That is, a configuration may be adopted in which the cells 21 to 24 are respectively discharged by the individual discharge units 51 to 54.

The invention claimed is:

1. An equalization control device for equalizing a cell voltage of an in-vehicle power storage unit that includes a plurality of cells, comprising:
   a voltage detection unit configured to individually detect the cell voltage of each of the cells;
   an individual discharge unit configured to individually discharge each of the cells;
   a setting unit configured to set, in an updatable manner, a first threshold serving as a reference value for comparing with the cell voltage detected by the voltage detection unit;
   a charge circuit unit configured to charge the in-vehicle power storage unit;
   a current detection unit configured to detect an output current of the charge circuit unit;
   a control unit configured to control the individual discharge unit; and
   a temperature detection unit configured to detect a temperature of the in-vehicle power storage unit,
   wherein the control unit:
   controls a charge operation of the charge circuit unit such that an output voltage of the in-vehicle power storage unit achieves a charge target voltage,
   after the current detected by the current detection unit becomes less than or equal to a predetermined value during control of the charge operation, compares the cell voltage of each of the cells detected by the voltage detection unit with the first threshold set by the setting unit and controls the individual discharge unit to selectively discharge a discharge target cell whose cell voltage is higher than the first threshold among the plurality of cells,
   compares the cell voltage of the discharge target cell with a second threshold that is smaller than the first threshold during discharging of the discharge target cell, while continuing the charge operation of the charge circuit unit, and, in a case where the cell voltage of the discharge target cell reaches the second threshold, causes the individual discharge unit to stop discharging the discharge target cell, and
   ends the charge operation of the charge circuit unit in a case where discharging is no longer being performed in any of the cells, after discharging of one of the discharge target cells was started, and
   the setting unit performs setting so as to reduce the first threshold and the second threshold and such that the second threshold decreases more than the first threshold, as the temperature detected by the temperature detection unit increases.

2. The equalization control device according to claim 1, comprising a discharge circuit unit configured to discharge the in-vehicle power storage unit,
   wherein the control unit controls the discharge circuit unit such that the output voltage of the in-vehicle power storage unit achieves a discharge target voltage, stops the discharge operation of the discharge circuit unit, after the output voltage of the in-vehicle power storage unit reaches the discharge target voltage, compares the cell voltage of each of the cells with the first threshold, after stopping the discharge operation, and, in a case where the discharge target cell is detected, causes the individual discharge unit to discharge the detected discharge target cell.

3. An in-vehicle power supply device comprising:
the equalization control device according to claim 1; and
an in-vehicle power storage unit.

4. An in-vehicle power supply device comprising:
the equalization control device according to claim 2; and
an in-vehicle power storage unit.

* * * * *